US012694464B2

(12) United States Patent
Ren et al.

(10) Patent No.: US 12,694,464 B2
(45) Date of Patent: Jul. 28, 2026

(54) DATA PROCESSING METHOD AND RELATED APPARATUS

(71) Applicant: Huawei Technologies Co., Ltd., Shenzhen (CN)

(72) Inventors: Jing Ren, Shenzhen (CN); Deyou Kong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 18/308,969

(22) Filed: Apr. 28, 2023

(65) Prior Publication Data

US 2023/0267570 A1      Aug. 24, 2023

Related U.S. Application Data

(63) Continuation of application No. PCT/CN2021/126872, filed on Oct. 28, 2021.

(30) Foreign Application Priority Data

Oct. 28, 2020     (CN) .......................... 202011172043.X

(51) Int. Cl.
*G06T 1/20* (2006.01)
*G06F 9/50* (2006.01)

(52) U.S. Cl.
CPC .............. *G06T 1/20* (2013.01); *G06F 9/5027* (2013.01)

(58) Field of Classification Search
CPC ......... G06T 1/20; G06T 15/005; G06T 15/04; G06T 1/60; G06T 1/00; G06F 9/5027
See application file for complete search history.

(56) References Cited

U.S. PATENT DOCUMENTS

| 6,717,577 B1 * | 4/2004 | Cheng | .................. | G06T 15/005 |
| | | | | 345/557 |
| 8,347,275 B2 * | 1/2013 | Quarre | .................. | G06T 15/00 |
| | | | | 717/109 |

(Continued)

FOREIGN PATENT DOCUMENTS

| CN | 106127671 A | 11/2016 | |
| CN | 111222301 A * | 6/2020 | ............. G06T 15/04 |

(Continued)

OTHER PUBLICATIONS

OpenGL. Vertex Shader [Online]. Nov. 10, 2017 [Retrieved on Mar. 6, 2025]. Retrieved from the Internet: <https://www.khronos.org/opengl/wiki/Vertex_Shader#:~:text=Inputs%5Bedit%5D,assign%20the%20given%20index%20to.> (Year: 2017).*

(Continued)

*Primary Examiner* — King Y Poon
*Assistant Examiner* — Michelle Hau Ma
(74) *Attorney, Agent, or Firm* — Conley Rose, P.C.

(57) ABSTRACT

A data processing method includes a graphics processing unit (GPU) obtaining rendering data that is sent by a central processing unit (CPU) and that includes a plurality of pieces of attribute data. The GPU stores the plurality of pieces of attribute data into continuous storage space, for example, stores the plurality of pieces of attribute data into the continuous storage space in a form of an array. Then, the GPU directly determines an address of target attribute data in the continuous storage space based on an attribute selector to obtain the target attribute data.

20 Claims, 7 Drawing Sheets

(56)                    References Cited

U.S. PATENT DOCUMENTS

| | | | | |
|---|---|---|---|---|
| 2012/0223946 A1* | 9/2012 | Nystad | .................. | G06T 15/005 |
| | | | | 345/426 |
| 2018/0075571 A1* | 3/2018 | Zhou | ..................... | G06T 15/005 |
| 2020/0311862 A1* | 10/2020 | Chung | ...................... | G06T 1/60 |
| 2020/0379669 A1* | 12/2020 | Jo | ......................... | G06F 3/0676 |

FOREIGN PATENT DOCUMENTS

| | | | |
|---|---|---|---|
| CN | 111338988 A | | 6/2020 |
| JP | 2000123190 A | * | 4/2000 |

OTHER PUBLICATIONS

Parlante, Nick, et al. The Ins and Outs of C Arrays [Online]. Jul. 4, 2010 [Date retrieved from Wayback Machine]. [Retrieved on Mar. 6, 2025] Retrieved from the Internet: <https://see.stanford.edu/materials/icsppcs107/07-Arrays-The-Full-Story.pdf> (Year: 2010).*
Ed, Angel, et al. "An Introduction to Shader Based OpenGL Programming". Aug. 3, 2009. pp. 24 and 27. (Year: 2009).*
OGL dev Modern OpenGL Tutorials. Tutorial 32: Vertex Array Objects [Online]. Jan. 19, 2019 [Date from Wayback Machine. Retrieved on Nov. 18, 2025]. Retrieved from the Internet: <URL: https://www.ogldev.org/www/tutorial32/tutorial32.html > (Year: 2019).*
Ed Angel et al:"An Introduction to Shader Based OpenGL Programming." Aug. 3, 2009. total 152 pages.
I. Sung, G. D. Liu and W. W. Hwu, "DL: A data layout transformation system for heterogeneous computing," 2012 Innovative Parallel Computing (InPar), San Jose, CA, USA, May 13-14, 2012, pp. 1-11, doi: 10.1109/InPar.2012.6339606.

* cited by examiner

Location: storage location

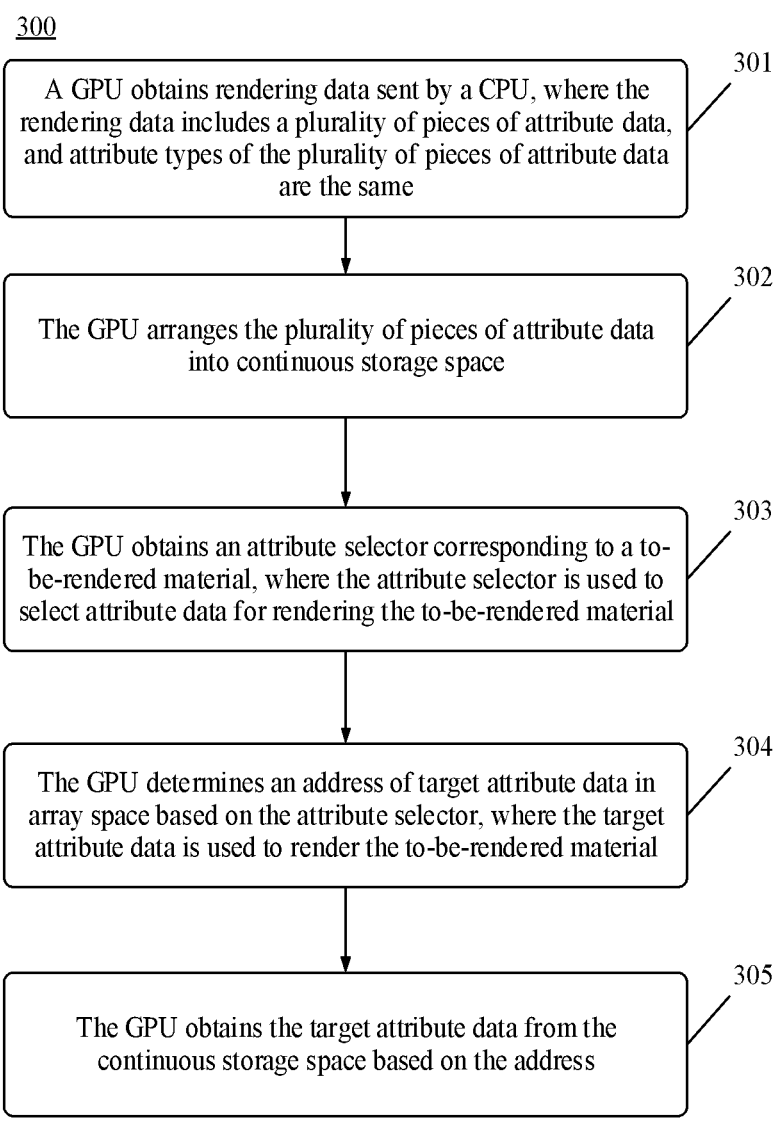

300

A GPU obtains rendering data sent by a CPU, where the rendering data includes a plurality of pieces of attribute data, and attribute types of the plurality of pieces of attribute data are the same — 301

The GPU arranges the plurality of pieces of attribute data into continuous storage space — 302

The GPU obtains an attribute selector corresponding to a to-be-rendered material, where the attribute selector is used to select attribute data for rendering the to-be-rendered material — 303

The GPU determines an address of target attribute data in array space based on the attribute selector, where the target attribute data is used to render the to-be-rendered material — 304

The GPU obtains the target attribute data from the continuous storage space based on the address — 305

FIG. 3

Position: position        Normal: normal        UV: texture coordinate

S=0: [2*S, 2*S+1]=[0, 1]

S=1: [2*S, 2*S+1]=[2, 3]

S=2: [2*S, 2*S+1]=[4, 5]

S=3: [2*S, 2*S+1]=[6, 7]

DATA PROCESSING METHOD AND RELATED APPARATUS

CROSS-REFERENCE TO RELATED APPLICATIONS

This is a continuation of International Patent Application No. PCT/CN2021/126872 filed on Oct. 28, 2021, which claims priority to Chinese Patent Application No. 202011172043.X filed on Oct. 28, 2020. The disclosures of the aforementioned applications are hereby incorporated by reference in their entireties.

TECHNICAL FIELD

This disclosure relates to the field of computer technologies, and in particular, to a data processing method and a related apparatus.

BACKGROUND

Rendering is a process of projecting a model in a three-dimensional scenario into a two-dimensional image based on a set environment, light, material, and rendering parameter. The two-dimensional image generated through rendering can well reflect the three-dimensional scenario.

At present, in a mobile terminal or another type of computer, the rendering process is usually completed by a graphics processing unit (GPU). When rendering needs to be performed on a scenario, a central processing unit (CPU) transmits a to-be-rendered material and attribute data that needs to be used, for example, attribute data such as position attribute data, color attribute data, or texture attribute data, to the GPU; and the GPU renders the material based on the attribute data.

However, in a related technology, when a plurality of pieces of attribute data are available for a material, the GPU needs to frequently perform condition determining during rendering, to select attribute data actually required by the material. Because the GPU frequently performs condition determining, and execution logic of the GPU is complex, rendering efficiency of the GPU is low.

SUMMARY

This disclosure provides a data processing method. A GPU arranges a plurality of pieces of obtained attribute data of a same attribute type into data space, so that the GPU can directly determine an address of target attribute data in continuous storage space based on an attribute selector, thereby directly obtaining the target data. This avoids performing condition determining by the GPU, ensures that the GPU can have high instruction execution efficiency, and improves rendering efficiency of the GPU.

A first aspect of this disclosure provides a data processing method. The method may be applied to an electronic device having a CPU and a GPU, and the electronic device can perform an image rendering process. The method includes: the GPU obtains rendering data sent by a CPU, where the rendering data may be, for example, vertex data or fragment data, and the rendering data includes a plurality of pieces of attribute data of a same attribute type, for example, a plurality of pieces of texture coordinate attribute data, a plurality of pieces of color attribute data, or a plurality of pieces of weight attribute data. The GPU stores the plurality of pieces of attribute data into continuous storage space. The continuous storage space may be, for example, array space.

The array space is a continuous memory block, and is used to store a plurality of pieces of attribute data that are sequentially arranged, that is, the plurality of pieces of attribute data are stored in a segment of continuous address space. The GPU obtains an attribute selector corresponding to a to-be-rendered material. The attribute selector is used to select attribute data for rendering the to-be-rendered material. For example, the attribute selector may be carried in the to-be-rendered material, and can indicate any one of the plurality of pieces of attribute data. The GPU determines an address of target attribute data in the continuous storage space based on the attribute selector, where the target attribute data is used to render the to-be-rendered material. The GPU obtains the target attribute data from the continuous storage space based on the address, to implement rendering of the to-be-rendered material.

In this solution, after the GPU obtains the rendering data sent by the CPU, the GPU arranges the plurality of pieces of attribute data of the same attribute type in the rendering data into the data space, so that the GPU can directly determine the address of the target attribute data in the continuous storage space based on the attribute selector, thereby obtaining the target data, avoiding performing condition determining by the GPU, ensuring that the GPU can have high instruction execution efficiency, and improving rendering efficiency of the GPU.

In a possible implementation, that the GPU sequentially arranges the plurality of pieces of attribute data into continuous storage space may include: the GPU arranges the plurality of pieces of attribute data into the continuous storage space based on a storage sequence of the plurality of pieces of attribute data in the rendering data. In other words, the GPU may arrange the plurality of pieces of attribute data based on a sequence of storing the plurality of pieces of attribute data in the rendering data. To be specific, if a piece of attribute data stored in front in the rendering data has a high ranking in the continuous storage space.

In a possible implementation, the method further includes: the GPU obtains indication information sent by the CPU, where the indication information indicates location information of the plurality of pieces of attribute data in the rendering data. For example, when the CPU stores corresponding attribute data by using a preset storage location (location), the location indicates a location of each piece of attribute data, and each location may store one piece of corresponding attribute data. The indication information obtained by the GPU may include a mapping relationship between the attribute data and the location. That the GPU arranges the plurality of pieces of attribute data into the continuous storage space based on a storage sequence of the plurality of pieces of attribute data in the rendering data may include: the GPU determines a location of each of the plurality of pieces of attribute data in the rendering data based on the indication information (for example, the mapping relationship between the attribute data and the location). The GPU arranges the plurality of pieces of attribute data into the continuous storage space based on a sequence of locations corresponding to each piece of attribute data. For example, the GPU may arrange the plurality of pieces of attribute data into the continuous storage space based on a sequence of numbers of the locations. A smaller number of a location indicates a higher ranking of a corresponding piece of attribute data in the continuous storage space.

In this solution, the GPU determines a location of each of the plurality of pieces of attribute data based on the indication information, and determines an arrangement sequence of the attribute data in the continuous storage space based on a location relationship between each piece of attribute data, so as to arrange the plurality of pieces of attribute data into the continuous storage space, thereby ensuring implementability of the solution.

In a possible implementation, for a plurality of pieces of attribute data of a same attribute type in the vertex data, the CPU may allocate a corresponding attribute index to each of the plurality of pieces of attribute data, to indicate each piece of attribute data. For example, for UV attribute data 0, UV attribute data 1, UV attribute data 2, and UV attribute data 3, attribute indexes allocated by the CPU may be 0, 1, 2, and 3, respectively, and any one of the plurality of pieces of attribute data may be uniquely determined based on the attribute index. In addition, to enable the GPU to select the target attribute data corresponding to the to-be-rendered material, the CPU may allocate a corresponding attribute selector to the to-be-rendered material. The attribute selector may be actually an attribute index corresponding to the target attribute data. Therefore, the indication information sent by the CPU may include a mapping relationship between an attribute index and a location in the rendering data, where the attribute index is used to represent each of the plurality of pieces of attribute data. Based on the mapping relationship and the attribute selector in the indication information, the GPU may determine a location, in the vertex data, of each piece of attribute data in the vertex data. The mapping relationship between the attribute index of the attribute data and the location is established, so that on the basis of effectively indicating the location corresponding to the attribute data, a data amount of the indication information can be reduced, and transmission bandwidth can be saved.

In a possible implementation, one location in the rendering data is used to store one or more pieces of attribute data of a same attribute type. For example, when the vertex data includes a plurality of pieces of attribute data of a same attribute type, and space of the location is sufficient to support storage of the plurality of pieces of attribute data of the same attribute, more than one piece of attribute data may be stored in one location, and attribute types of attribute data stored in a same location are the same. Simply speaking, after determining that the vertex data includes a plurality of pieces of attribute data of a same attribute type, the CPU may determine, based on a data length of the attribute data of the same attribute type, whether the plurality of pieces of attribute data can be stored in the location at the same time. If the plurality of pieces of attribute data can be stored in the location at the same time, the CPU stores the plurality of pieces of attribute data of the same attribute type in one location. Otherwise, the CPU separately stores the plurality of pieces of attribute data of the same attribute type in a plurality of locations. A plurality of pieces of attribute data of a same attribute type is stored in one location, so that location setting can be reduced, and memory resource overheads can be reduced.

In this solution, after a plurality of pieces of attribute data of a same attribute type in rendering data are arranged into continuous storage space, an address of target attribute data is determined based on an attribute selector, so as to obtain the target attribute data. Therefore, in comparison with the related technology in which only one piece of attribute data can be stored in a location, this solution in which a plurality of pieces of attribute data of an attribute type may be stored in a location does not affect normal obtaining of the target attribute data by the GPU. Therefore, location setting can be reduced, and memory resource overheads can be reduced.

In a possible implementation, that the GPU determines an address of target attribute data in the continuous storage space based on the attribute selector may include: the GPU determines the address of the target attribute data in the continuous storage space based on the attribute selector and a data length of the target attribute data, where data lengths of the plurality of pieces of attribute data are the same. In other words, because a plurality of pieces of attribute data in data space are data of a same attribute type, data lengths of the plurality of pieces of attribute data are the same. In this case, when an address segment of the data space and a quantity of pieces of attribute data in the data space are known, an address corresponding to each piece of attribute data may be determined based on a storage sequence of the attribute data in the data space. For example, an address segment of the continuous storage space obtained by arranging the UV attribute data 0, the UV attribute data 1, the UV attribute data 2, and the UV attribute data 3 is 0-7, and a data length of each piece of attribute data in the continuous storage space is 2. In this case, when attribute selectors are respectively 0 to 3, addresses of the target attribute data corresponding to the attribute selectors may be obtained based on values of the attribute selectors and the data length of the attribute data. For example, when the attribute selector is 0, it may be determined that the address of the target attribute data is 0-1. When the attribute selector is 2, it may be determined that the address of the target attribute data is 4-5.

In a possible implementation, the method further includes: the GPU obtains a starting address of the continuous storage space. That the GPU determines the address of the target attribute data in the continuous storage space based on the attribute selector and a data length of the target attribute data includes: the GPU determines a starting address of the target attribute data in the continuous storage space based on the starting address of the continuous storage space and a product of the attribute selector and the data length; and the GPU determines an end address of the target attribute data in the continuous storage space based on the starting address of the target attribute data in the continuous storage space and the data length. For example, when the data length is 2, the attribute selection is S, and the starting address of the continuous storage space is N, the starting address of the target attribute data in the continuous storage space is N+2*S, and the end address of the target attribute data in the continuous storage space is N+2*S+1.

In a possible implementation, the rendering data is determined by the CPU based on the to-be-rendered material, and all attribute data included in the rendering data is attribute data required for rendering the to-be-rendered material. Simply speaking, in a rendering standard of a material, there may be a plurality of pieces of attribute data of a same attribute type, for example, there are six pieces of UV attribute data of a same attribute type. However, in an actual rendering process, a to-be-rendered material may not need to use attribute data of all attribute types in the rendering standard. For example, the to-be-rendered material needs to use only four pieces of UV attribute data. In this case, the CPU may determine, based on an attribute type of attribute data that needs to be used for the to-be-rendered material, attribute data required for rendering the to-be-rendered material in advance, so as to avoid transmitting attribute data of all attribute types in the rendering data, thereby saving transmission bandwidth.

In a possible implementation, the rendering data includes position attribute data, normal attribute data, color attribute data, texture coordinate attribute data, tangent attribute data, joint attribute data, and/or weight attribute data.

A second aspect of this disclosure provides an electronic device. The electronic device includes a processing unit and an obtaining unit. The obtaining unit is configured to obtain rendering data sent by a CPU, where the rendering data includes a plurality of pieces of attribute data, and attribute types of the plurality of pieces of attribute data are the same. The processing unit is configured to arrange the plurality of pieces of attribute data into continuous storage space. The obtaining unit is further configured to obtain an attribute selector corresponding to a to-be-rendered material, where the attribute selector is used to select attribute data for rendering the to-be-rendered material. The processing unit is further configured to determine an address of target attribute data in the continuous storage space based on the attribute selector, where the target attribute data is used to render the to-be-rendered material. The processing unit is further configured to obtain the target attribute data from the continuous storage space based on the address.

In a possible implementation, the processing unit is further configured to arrange the plurality of pieces of attribute data into the continuous storage space based on a storage sequence of the plurality of pieces of attribute data in the rendering data.

In a possible implementation, the obtaining unit is further configured to obtain indication information sent by the CPU, where the indication information indicates location information of the plurality of pieces of attribute data in the rendering data. The processing unit is further configured to determine, based on the indication information, a storage location of each of the plurality of pieces of attribute data in the rendering data. The processing unit is further configured to arrange the plurality of pieces of attribute data into the continuous storage space based on a sequence of the storage locations.

In a possible implementation, the indication information includes a mapping relationship between an attribute index and a storage location in the rendering data, and the attribute index indicates each of the plurality of pieces of attribute data.

In a possible implementation, the storage location in the rendering data is used to store one or more pieces of attribute data of a same attribute type.

In a possible implementation, the processing unit is further configured to determine the address of the target attribute data in the continuous storage space based on the attribute selector and a data length of the target attribute data, where data lengths of the plurality of pieces of attribute data are the same.

In a possible implementation, the obtaining unit is further configured to obtain a starting address of the continuous storage space. The processing unit is further configured to: determine a starting address of the target attribute data in the continuous storage space based on the starting address of the continuous storage space and a product of the attribute selector and the data length; and determine an end address of the target attribute data in the continuous storage space based on the starting address of the target attribute data in the continuous storage space and the data length.

In a possible implementation, the rendering data is determined by the CPU based on the to-be-rendered material, and all attribute data included in the rendering data is attribute data required for rendering the to-be-rendered material.

In a possible implementation, the rendering data includes position attribute data, normal attribute data, color attribute data, texture coordinate attribute data, tangent attribute data, joint attribute data, and/or weight attribute data.

A third aspect of this disclosure provides an electronic device. The electronic device includes a processor, a non-volatile memory, and a volatile memory. The non-volatile memory or the volatile memory stores computer-readable instructions. The processor reads the computer-readable instructions, so that the electronic device implements the method according to any one of the implementations of the first aspect.

A fourth aspect of this disclosure provides a computer-readable storage medium. The computer-readable storage medium stores a computer program. When the computer program is run on a computer, the computer is enabled to perform the method according to any one of the implementations of the first aspect.

A fifth aspect of this disclosure provides a computer program product. When the computer program product runs on a computer, the computer is enabled to perform the method according to any one of the implementations of the first aspect.

A sixth aspect of this disclosure provides a chip, including one or more processors. Some or all of the processors are configured to read and execute a computer program stored in a memory, to perform the method according to any possible implementation of any one of the foregoing aspects. Optionally, the chip includes the memory, and the memory and the processor are connected to the memory by using a circuit or a wire. Optionally, the chip further includes a communication interface, and the processor is connected to the communication interface. The communication interface is configured to receive data and/or information that needs to be processed. The processor obtains the data and/or the information from the communication interface, processes the data and/or the information, and outputs a processing result through the communication interface. The communication interface may be an input/output interface. The method provided in this disclosure may be implemented by one chip, or may be cooperatively implemented by a plurality of chips.

BRIEF DESCRIPTION OF DRAWINGS

FIG. 3 is a schematic flowchart of a data processing method according to an embodiment of this disclosure.

DESCRIPTION OF EMBODIMENTS

Figure 1:
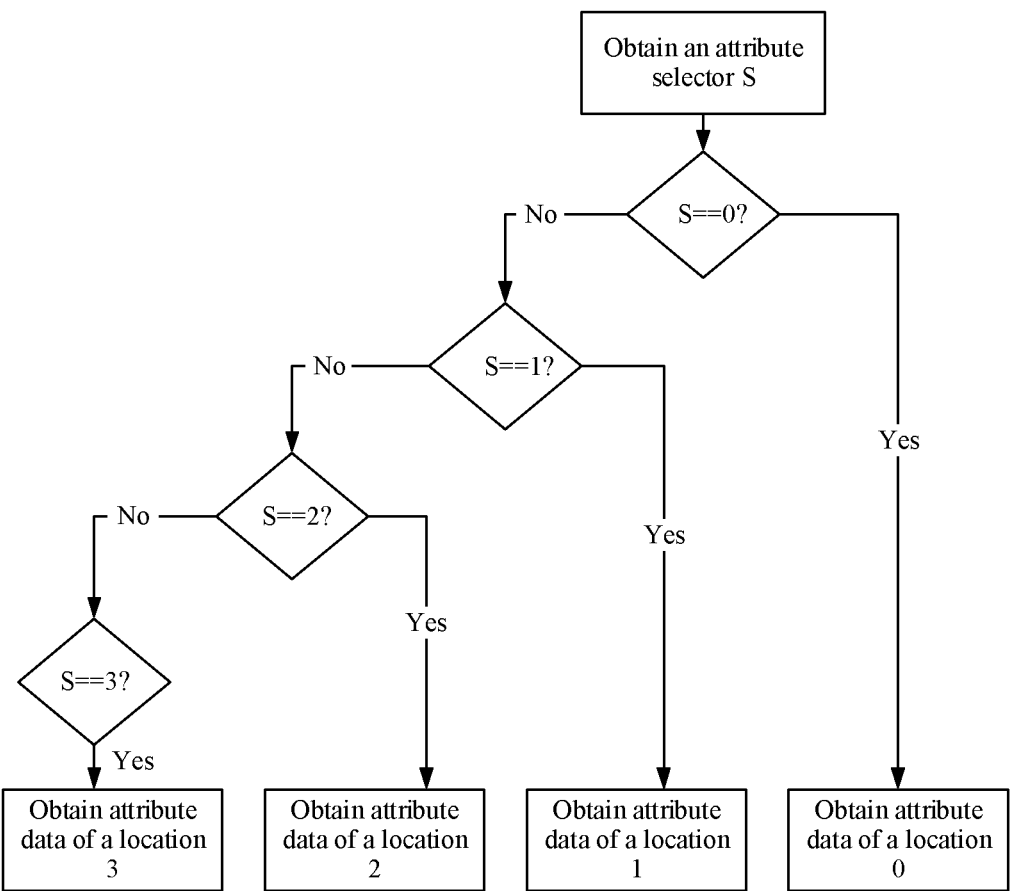
FIG. 1 is a schematic flowchart of obtaining attribute data in a related technology.

The following describes embodiments of this disclosure with reference to accompanying drawings. It is clear that the described embodiments are merely some but not all of embodiments of this disclosure. A person of ordinary skill in the art may learn that, with technology development and emergence of a new scenario, the technical solutions provided in embodiments of this disclosure are also applicable to a similar technical problem.

In the specification, claims, and accompanying drawings of this disclosure, the terms "first", "second", and the like are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include", "have" and any other variants mean to cover the non-exclusive inclusion, for example, a process, method, system, product, or device that includes a list of steps or modules is not necessarily limited to those expressly listed steps or modules, but may include other steps or modules not expressly listed or inherent to such a process, method, product, or device. Names or numbers of steps in this disclosure do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved.

With development of computer technologies, more applications, such as a game application or a video application, require that quality of images displayed on an electronic device are exquisite. These images are usually obtained by the electronic device by performing rendering based on a model in a three-dimensional scenario.

At present, in the electronic device, a rendering process is usually completed by a GPU. When rendering needs to be performed on a scenario, a CPU transmits a to-be-rendered material and attribute data that needs to be used, for example, attribute data such as position attribute data, color attribute data, or texture attribute data, to the GPU; and the GPU renders the material based on the attribute data. As a three-dimensional scenario in an application becomes increasingly complex, attribute data used to render a material also becomes increasingly complex. Some attributes of the to-be-rendered material may usually include a plurality of pieces of attribute data of a same type, for example, include three pieces of texture attribute data or seven pieces of color attribute data.

In a related technology, when a plurality of pieces of attribute data of a same type are available for the material, the GPU usually needs to frequently perform condition determining during rendering of a vertex or a fragment, to select attribute data actually required by the vertex or the fragment. Because the GPU frequently performs condition determining, and execution logic of the GPU is complex, rendering efficiency of the GPU is reduced.

For example, when transmitting the attribute data of the vertex to the GPU, the CPU usually creates a plurality of locations to carry the attribute data, and different attribute data is located in different locations. It is assumed that the CPU transmits four pieces of attribute data of a same attribute type to the GPU: attribute data 0, attribute data 1, attribute data 2, and attribute data 3, and the four pieces of attribute data are respectively located at a location 0, a location 1, a location 2 and a location 3. In this case, when the GPU renders a vertex, the GPU may obtain an attribute selector corresponding to the vertex, and then execute a corresponding condition determining statement based on a value of the attribute selector, to obtain attribute data corresponding to the attribute selector.

The GPU may perform condition determining by invoking an if-else statement or a switch-case statement. For example, the GPU uses the if-else statement to perform condition determining as follows:

```
if (s==0) use location0 // If s is equal to 0, attribute data of the location
0 is obtained;
  else if (s==1) use location1 // If s is equal to 1, attribute data of the
  location 1 is obtained;
  else if (s==2) use location2 // If s is equal to 2, attribute data of the
  location 2 is obtained;
or
  else if (s==3) use location3 // If s is equal to 3, attribute data of the
  location 3 is obtained.
```

FIG. 1 is a schematic flowchart of obtaining attribute data in a related technology. It can be learned with reference to the foregoing example and FIG. 1 that when the GPU needs to select, from a plurality of pieces of attribute data of a same attribute type, attribute data corresponding to an attribute selector, the GPU usually needs to perform condition determining for a plurality of times, to select required attribute data. When there are a large quantity of attribute data of a same attribute type, the GPU may need to execute a plurality of condition determining statements to obtain the required attribute data. Consequently, instruction execution efficiency of the GPU is low, and rendering efficiency of the GPU is reduced.

In view of this, an embodiment of this disclosure provides a data processing method. A GPU arranges a plurality of pieces of obtained attribute data of a same attribute type into data space, so that the GPU can directly determine an address of target attribute data in the continuous storage space based on an attribute selector, thereby directly obtaining the target data. This avoids performing condition determining by the GPU, ensures that the GPU can have high instruction execution efficiency, and improves rendering efficiency of the GPU.

The data processing method in this embodiment of this disclosure may be performed by an electronic device. The electronic device includes a CPU and a GPU, and can perform rendering processing on an image. For example, the electronic device may be, for example, a mobile phone, a tablet computer, a notebook computer, a personal computer (PC), a mobile Internet device (MID), a wearable device, a virtual reality (VR) device, an augmented reality (AR) device, a wireless electronic device in industrial control, a wireless electronic device in self driving, a wireless electronic device in remote medical surgery, a wireless electronic device in a smart grid, a wireless electronic device in transportation safety, a wireless electronic device in a smart city, or a wireless electronic devices in a smart home. The electronic device may be a device that runs an ANDROID system, an IOS system, a WINDOWS system, or another system.

Figure 2:
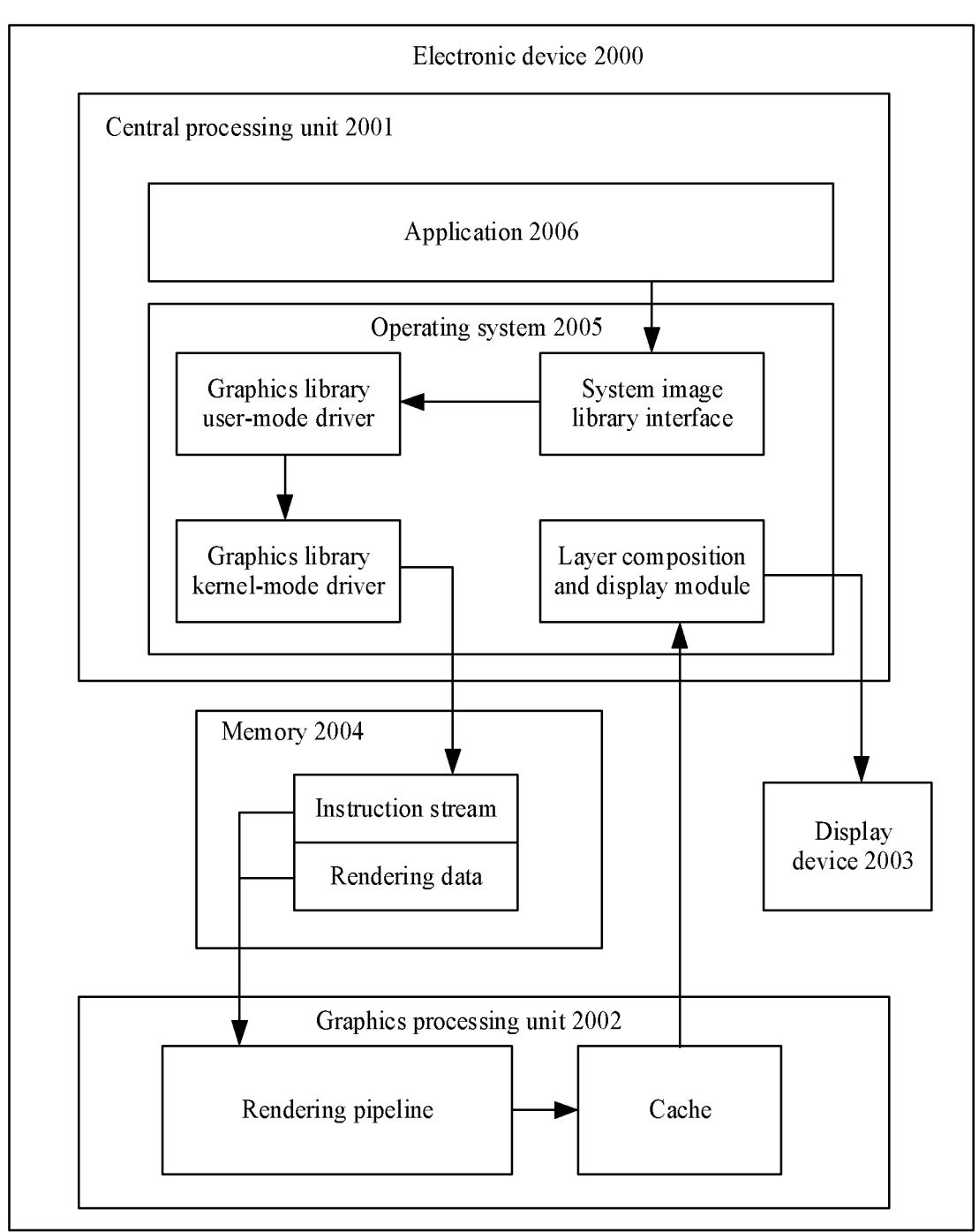
FIG. 2 is a schematic diagram of a structure of an electronic device according to an embodiment of this disclosure.

For ease of understanding, a specific structure of the electronic device is described in detail below with reference to FIG. 2. FIG. 2 is a schematic diagram of a structure of an electronic device according to an embodiment of this disclosure.

In a possible embodiment, as shown in FIG. 2, an electronic device 2000 may include: a CPU 2001, a GPU 2002, a display device 2003, and a memory 2004. Optionally, the electronic device 2000 may further include at least one communication bus (not shown in FIG. 2), configured to implement connection and communication between components.

It should be understood that alternatively, components in the electronic device 2000 may be mutually coupled by using another connector, and the other connector may include various interfaces, transmission lines, buses, or the like. The components in the electronic device 2000 may alternatively be connected in a radioactive manner by using the CPU 2001 as a center. In embodiments of this disclosure, coupling is mutual electrical connection or communication, including direct connection or indirect connection performed by using another device.

The CPU 2001 and the GPU 2002 may also be connected in a plurality of manners, which are not limited to the manner shown in FIG. 2. The CPU 2001 and the GPU 2002 in the electronic device 2000 may be located on a same chip, or each may be an independent chip.

The following briefly describes functions of the CPU 2001, the GPU 2002, the display device 2003, and the memory 2004.

The CPU 2001 is configured to run an operating system 2005 and an application 2006. The application 2006 may be a graphical application, such as a game or a video player. The operating system 2005 provides a system graphics library interface. The application 2006 generates an instruction stream used to render a graphic or an image frame and required related rendering data by using a system graphics library interface and a driver program provided by the operating system 2005, such as a graphics library user-mode driver and/or a graphics library kernel-mode driver. A system graphics library includes, but is not limited to, a system graphics library such as an open graphics library for embedded system (Open Graphics Library for Embedded Systems (OpenGL ES)), a Khronos platform graphics interface, or Vulkan (a cross-platform drawing application interface). The instruction stream includes a series of instructions, and these instructions are usually instructions for calling the system graphics library interface.

Optionally, the CPU 2001 may include at least one of the following types of processors: an application processor, one or more microprocessors, a digital signal processor (DSP), a microcontroller unit (MCU), an artificial intelligence processor, or the like.

The CPU 2001 may further include a necessary hardware accelerator, such as an application-specific integrated circuit (ASIC), a field-programmable gate array (FPGA), or an integrated circuit configured to implement a logical operation. The processor 2001 may be coupled to one or more data buses, configured to transmit data and instructions between the components in the electronic device 2000.

The GPU 2002 is configured to: receive a graphics instruction stream sent by the processor 2001, generate a rendering target by using a rendering pipeline, and display the rendering target on the display device 2003 by using a layer composition and display module in the operating system. The rendering pipeline may also be referred to as a rendering pipeline, a pixel pipeline, or a pixel pipeline, and is a parallel processing unit configured to process a graphics signal in the GPU 2002. The GPU 2002 may include a plurality of rendering pipelines, and the plurality of rendering pipelines may independently process graphics signals in parallel. For example, the rendering pipeline may perform a series of operations in a process of rendering a graphic or image frame. Typical operations may include vertex processing, primitive processing, rasterization, fragment processing, and the like.

Optionally, the GPU 2002 may include a general-purpose graphics processing unit that executes software, such as a GPU or another type of dedicated GPU.

The display device 2003 is configured to display various images generated by the electronic device 2000. The image may be a graphical user interface (GUI) in the operating system or image data (including a still image and video data) processed by the GPU 2002.

Optionally, the display device 2003 may include any suitable type of display screen, for example, a liquid-crystal display (LCD), a plasma display, or an organic light-emitting diode (OLED) display.

The memory 2004 is a transmission channel between the CPU 2001 and the GPU 2002, and may be a double data rate synchronous dynamic random-access memory (DDR SDRAM) or another type of cache.

The foregoing describes a specific structure of an electronic device to which the data processing method provided in this embodiment of this disclosure is applied. The following describes in detail a procedure of the data processing method provided in this embodiment of this disclosure.

FIG. 3 is a schematic flowchart of a data processing method 300 according to an embodiment of this disclosure. As shown in FIG. 3, the data processing method 300 includes the following steps.

Step 301: A GPU obtains rendering data sent by a CPU, where the rendering data includes a plurality of pieces of attribute data, and attribute types of the plurality of pieces of attribute data are the same.

In this embodiment, the rendering data may be vertex data or fragment data. In the image processing field, a vertex may be understood as a point in space, and may be represented by spatial coordinates of the vertex. In general, the vertex is the most basic element used to define a region to be rendered. Each vertex is rendered in a scenario, so that rendering of the entire scenario can be implemented. Generally, each vertex usually has corresponding vertex data. The vertex data indicates attribute data required for rendering the vertex. For example, the vertex data may include attribute data such as position attribute data, normal attribute data, color attribute data, texture coordinate (UV) attribute data, tangent attribute data, joint attribute data, or target weight attribute data. Different vertices may have different attribute data, and types of attribute data included in vertex data of the different vertices may also be different. For example, vertex data corresponding to a vertex A includes position attribute data, color attribute data, and texture coordinate attribute data. Vertex data corresponding to a vertex B includes position attribute data, normal attribute data, color attribute data, and texture coordinate attribute data.

Generally, after rendering the vertices, the GPU may combine the plurality of vertices into a primitive (for example, a point, a line segment, or a polygon), and then convert the primitive into a fragment through rasterization processing. The fragment may finally be converted into pixel data in an image. Rasterization processing is a process of converting a primitive into a two-dimensional image. Each point on the two-dimensional image obtained through conversion includes data such as a color, a depth, and a texture. The points on the two-dimensional image and related information thereof are referred to as a fragment.

Similarly, each fragment usually has corresponding fragment data, and the fragment data represents data required for rendering the fragment. The fragment data may also include the foregoing plurality of types of attribute data.

In a possible example, the rendering data is determined by the CPU based on to-be-rendered material, and the attribute data included in the rendering data is attribute data required for rendering the to-be-rendered material. Simply speaking, in a rendering standard of a material, there may be a plurality of pieces of attribute data of a same attribute type, for example, there are six pieces of UV attribute data of a same attribute type. However, in an actual rendering process, the to-be-rendered material may not need to use attribute data of all attribute types in the rendering standard. For example, the to-be-rendered material needs to use only four pieces of UV attribute data. In this case, the CPU may determine, based on an attribute type of attribute data that needs to be used for the to-be-rendered material, attribute data required for rendering the to-be-rendered material in advance, so as to avoid transmitting the attribute data of all the attribute types in the rendering data, thereby saving transmission bandwidth.

For ease of description, the following describes the data processing method provided in this embodiment of this disclosure by using an example in which the rendering data is vertex data.

In this embodiment, in a process in which rendering needs to be performed on an image, the GPU may receive the vertex data that is sent by the CPU and the to-be-rendered material, and the GPU renders the to-be-rendered material based on the received vertex data, to obtain a rendered image, where the image can be displayed on a display device. The vertex data received by the GPU includes a plurality of pieces of attribute data of a same attribute type, for example, a plurality of pieces of UV attribute data, a plurality of pieces of color attribute data, or a plurality of pieces of joint attribute data. The attribute type of the plurality of pieces of attribute data is not limited in embodiments of this disclosure.

It should be understood that there may be a plurality of groups of attribute data in the vertex data at the same time, and each group of attribute data includes a plurality of pieces of attribute data of a same attribute type. For example, the vertex data includes a plurality of pieces of UV attribute data and a plurality of pieces of color attribute data at the same time. Alternatively, there may be only one group of attribute data in the vertex data, and the group of attribute data includes a plurality of pieces of data of a same attribute type. For example, the vertex data includes only a plurality of pieces of UV attribute data, and there is only one piece of attribute data of other attribute types. For ease of description, the following describes the data processing method 300 provided in this embodiment of this disclosure by using an example in which only a plurality of pieces of attribute data of a same type exist in the vertex data.

Figure 4:
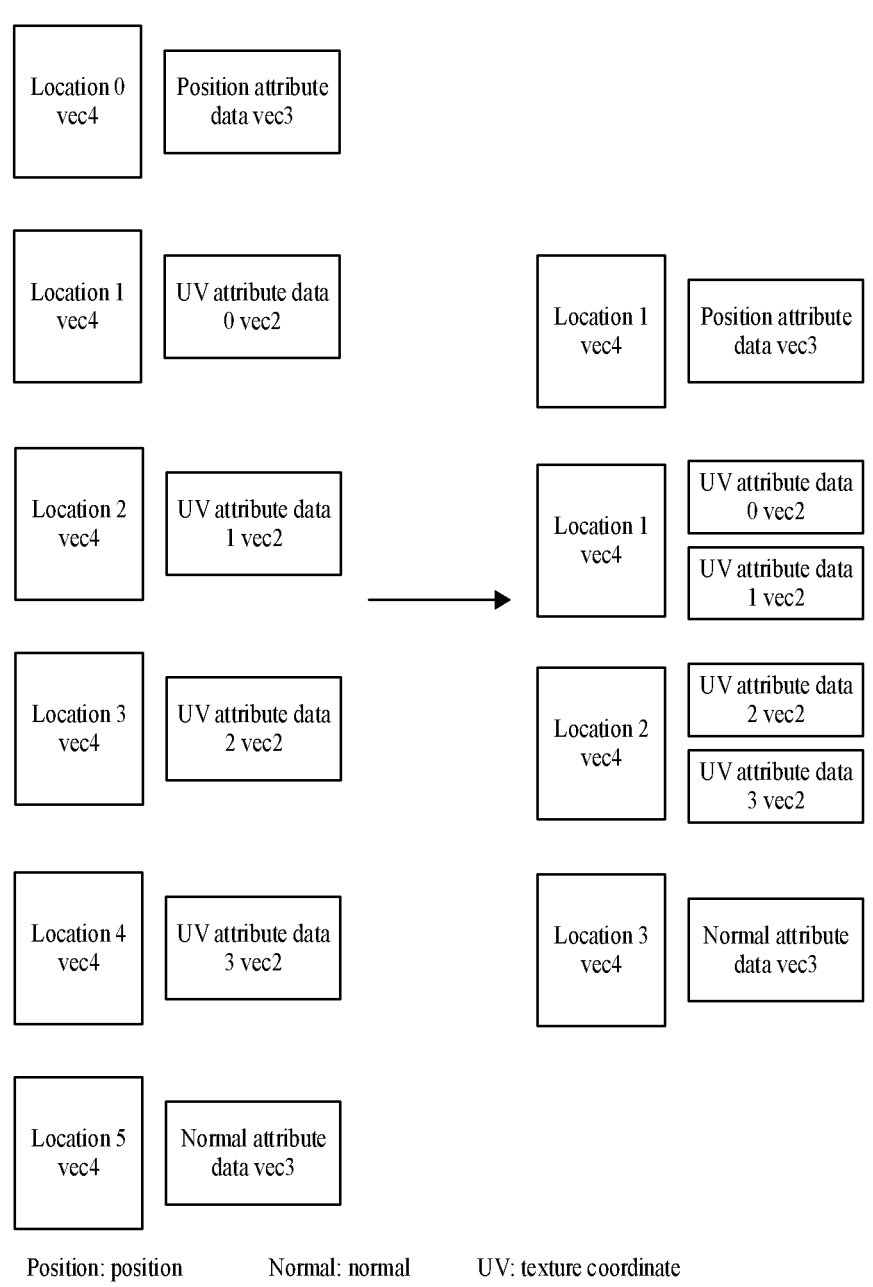
FIG. 4 is a schematic diagram of storing attribute data according to an embodiment of this disclosure.

In a possible example, because most attribute data in the vertex data is 2-dimensional vector data, 3-dimensional vector data, or 4-dimensional vector data, the CPU may store corresponding attribute data based on a preset storage location. The location indicates a location of each piece of attribute data, and one piece of corresponding attribute data may be stored in each location. FIG. 4 is a schematic diagram of storing attribute data according to an embodiment of this disclosure. As shown on the left side of FIG. 4, vertex data includes six pieces of attribute data in total. The six attributes are respectively position attribute data, UV attribute data 0, UV attribute data 1, UV attribute data 2, UV attribute data 3, and normal attribute data; and the six pieces of attribute data are sequentially stored in six locations: a location 0 to a location 5. A data length of attribute data that can be stored in a location is fixed. For example, a maximum data length of attribute data that can be stored in the location is a data length of a 4-dimensional vector. vec4 (vector 4) shown in FIG. 4 indicates that a maximum of one 4-dimensional vector can be stored in the location. However, actually, not all attribute data stored in the location is a 4-dimensional vector. For example, the position attribute data is a 3-dimensional vector, the UV attribute data is a 2-dimensional vector, and the normal attribute data is a 3-dimensional vector. Therefore, the data length of the attribute data actually stored in the location may be a data length of the 2-dimensional vector, a data length of the 3-dimensional vector, or a data length of the 4-dimensional vector.

In another possible example, when the vertex data includes a plurality of pieces of attribute data of a same attribute type, and space of the location is sufficient to support storage of the plurality of pieces of attribute data of the same attribute, more than one piece of attribute data may be stored in one location, and attribute types of attribute data stored in a same location are the same. As shown on the right side of FIG. 4, for UV attribute data 0, UV attribute data 1, UV attribute data 2, and UV attribute data 3 that are all two-dimensional vectors, two pieces of UV attribute data may be simultaneously stored in a single location. Therefore, the UV attribute data 0 and the UV attribute data 1 may be simultaneously stored in a location 1, and the UV attribute data 2 and the UV attribute data 3 may be simultaneously stored in a location 2.

In actual application, after determining that the vertex data includes the plurality of pieces of attribute data of a same attribute type, the CPU may determine, based on a data length of the attribute data of the same attribute type, whether the plurality of pieces of attribute data can be stored in a location at the same time. If the plurality of pieces of attribute data can be stored in the location at the same time, the CPU stores the plurality of pieces of attribute data of the same attribute type in one location. If the plurality of pieces of attribute data cannot be stored in the location at the same time, the CPU separately stores the plurality of pieces of attribute data of the same attribute type in a plurality of locations. The plurality of pieces of attribute data of the same attribute type is stored in one location, so that location setting can be reduced, and memory resource overheads can be reduced.

Step 302: The GPU arranges the plurality of pieces of attribute data into continuous storage space.

In this embodiment, after receiving the vertex data, the GPU may determine a plurality of pieces of attribute data of a same attribute type in the vertex data, and then continuously arrange the plurality of pieces of attribute data into the continuous storage space in a specific sequence. The continuous storage space may be, for example, array space. An array is an element sequence in sequence, and elements in the array have a same data type. The array space may be a continuous memory block used to store an array. A plurality of pieces of attribute data are arranged into the continuous storage space, so that the plurality of pieces of attribute data may be stored in the continuous memory block.

In a possible example, the GPU may arrange a plurality of pieces of attribute data into the continuous storage space based on a storage sequence of the plurality of pieces of attribute data in rendering data. In other words, the GPU may arrange the plurality of pieces of attribute data according to a sequence of storing the plurality of pieces of attribute data in the rendering data. To be specific, a higher ranking of a piece of attribute data in the rendering data indicates a higher ranking of the piece of attribute data in the continuous storage space.

In a possible example, the vertex data sent by the CPU may further include another piece of attribute data in addition to the plurality of pieces of attribute data. Therefore, to distinguish the plurality of pieces of attribute data from the other piece of attribute data, the GPU may receive indication information indicating location information of the attribute data, and determine locations of the plurality of pieces of attribute data in the vertex data based on the indication information.

Figure 5:
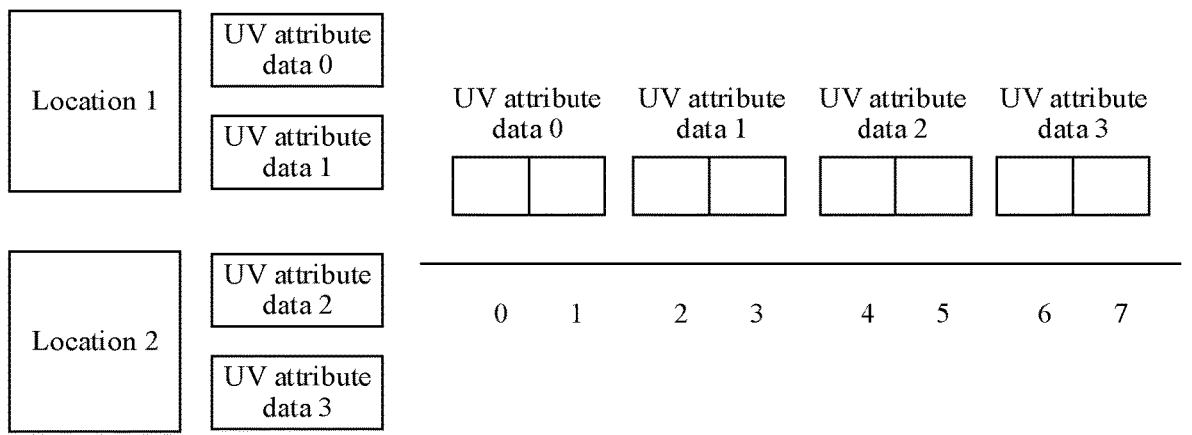
FIG. 5 is a schematic diagram of arranging attribute data into continuous storage space according to an embodiment of this disclosure.

For example, the GPU obtains indication information sent by the CPU, where the indication information indicates location information of the plurality of pieces of attribute data in the vertex data. The GPU determines a location of each of the plurality of pieces of attribute data in the vertex data based on the indication information. The GPU arranges the plurality of pieces of attribute data into the continuous storage space based on a sequence of the locations. The GPU may arrange the plurality of pieces of attribute data into the continuous storage space based on numbers of a plurality of locations in which the plurality of pieces of attribute data are located. FIG. 5 is a schematic diagram of arranging attribute data into continuous storage space according to an embodiment of this disclosure. As shown in FIG. 5, the UV data 0 and the UV data 1 that are located at a location 1, and the UV data 2 and the UV data 3 that are located at a location 2 are sequentially arranged into the continuous storage space based on numbers of the locations. In the continuous storage space obtained through arrangement, the UV attribute data 0, the UV attribute data 1, the UV attribute data 2, and the UV attribute data 3 are sequentially arranged from an address 0 to an address 7, and data lengths occupied by the pieces of UV attribute data in the continuous storage space are the same.

In a possible example, the indication information may include a mapping relationship between attribute data and a location in the vertex data. Based on the mapping relationship in the indication information, the GPU may determine a location, in the vertex data, of each piece of attribute data in the vertex data. For example, for the example shown on the right side of FIG. 4, the indication information obtained by the GPU may be shown in Table 1.

TABLE 1

| Location | Attribute data |
|---|---|
| Location 0 | Position attribute data |
| Location 1 | UV attribute data 0 and UV attribute data 1 |
| Location 2 | UV attribute data 2 and UV attribute data 3 |
| Location 3 | Normal attribute data |

It can be learned from Table 1 that the GPU may determine, based on the indication information, attribute data stored in each location, to determine locations at which a plurality of pieces of attribute data of a same attribute type are stored. In this way, the GPU may obtain the plurality of pieces of attribute data from the locations in which the plurality of pieces of attribute data are located, and sequentially arrange the plurality of pieces of attribute data into the continuous storage space.

Step 303: The GPU obtains an attribute selector corresponding to the to-be-rendered material, where the attribute selector is used to select attribute data for rendering the to-be-rendered material.

In a process of rendering the material by the GPU, the GPU may obtain the attribute selector corresponding to the to-be-rendered material, where the attribute selector may be carried in the to-be-rendered material, to select the attribute data for rendering the to-be-rendered material.

It should be understood that, for a plurality of pieces of attribute data of a same attribute type in the vertex data, the CPU may allocate a corresponding attribute index to each of the plurality of pieces of attribute data, to indicate each piece of attribute data. For example, for the UV attribute data 0, the UV attribute data 1, the UV attribute data 2, and the UV attribute data 3, attribute indexes allocated by the CPU may be 0, 1, 2, and 3, respectively, and any one of the plurality of pieces of attribute data may be uniquely determined based on the attribute indexes. In addition, to enable the GPU to select target attribute data corresponding to the to-be-rendered material, the CPU may allocate the corresponding attribute selector to the to-be-rendered material. The attribute selector may be actually an attribute index corresponding to the target attribute data. Therefore, based on the attribute selector, the GPU may uniquely determine the target attribute data used to render the to-be-rendered material.

Step 304: The GPU determines an address of the target attribute data in the continuous storage space based on the attribute selector, where the target attribute data is used to render the to-be-rendered material.

In a possible example, because a plurality of pieces of attribute data in data space are data of a same attribute type, data lengths of the plurality of pieces of attribute data are the same. In this case, when an address segment of the data space and a quantity of pieces of attribute data in the data space are known, an address corresponding to each piece of attribute data may be determined based on a storage sequence of the attribute data in the data space.

For example, after obtaining the attribute selector used to determine the attribute data, the GPU may determine the address of the target attribute data in the continuous storage space based on the attribute selector and a data length of the target attribute data. The GPU may obtain a starting address of the continuous storage space. Then, the GPU determines a starting address of the target attribute data in the continuous storage space based on the starting address of the continuous storage space and a product of the attribute selector and the data length. The GPU determines an end address of the target attribute data in the continuous storage space based on the starting address of the target attribute data in the continuous storage space and the data length.

Figure 6:
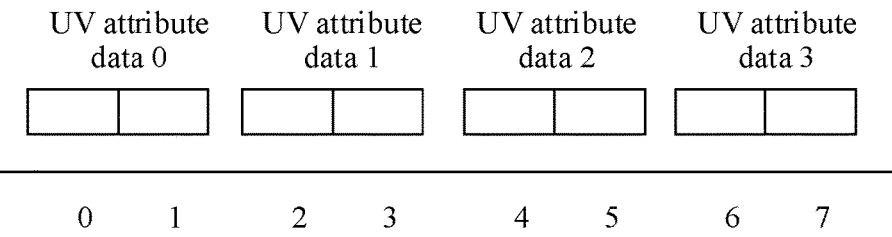
FIG. 6 is a schematic diagram of a structure of continuous storage space according to an embodiment of this disclosure.

FIG. 6 is a schematic diagram of a structure of continuous storage space according to an embodiment of this disclosure. As shown in FIG. 6, an address segment of the continuous storage space obtained by arranging the UV attribute data 0, the UV attribute data 1, the UV attribute data 2, and the UV attribute data 3 is 0-7, and a data length of each piece of attribute data in the continuous storage space is 2. In this case, when attribute selectors are respectively 0 to 3, addresses of the target attribute data corresponding to the attribute selectors may be obtained through calculation based on values of the attribute selectors and the data length of the attribute data. That is, the address of the target attribute data is [2*S, 2*S+1], where S represents the value of the attribute selector. For example, when the attribute selector is 0, it may be determined that the address of the target attribute data is 0-1. When the attribute selector is 2, it may be determined that the address of the target attribute data is 4-5.

FIG. 5 is described by using an example in which the starting address of the continuous storage space is 0. In an actual application, the starting address of the continuous storage space may not be 0, and the GPU may also determine, based on the attribute selector, the address of the target attribute data. For example, when the data length is 2, the attribute selection is S, and the starting address of the continuous storage space is N, the starting address of the target attribute data in the continuous storage space is N+2*S, and the end address of the target attribute data in the continuous storage space is N+2*S+1.

For example, it is assumed that the address segment of the continuous storage space obtained by arranging the UV attribute data 0, the UV attribute data 1, the UV attribute data 2, and the UV attribute data 3 is 15-22, and the data length of each piece of attribute data in the continuous storage space is 2. In this case, when the attribute selectors are respectively 0 to 3, the addresses of the target attribute data corresponding to the attribute selectors may be obtained through calculation based on the values of the attribute selectors, the data length of the attribute data, and the starting address of the continuous storage space. That is, the address of the target attribute data is [15+2*S, 15+2*S+1]. For example, when the attribute selector is 0, it may be determined that the address of the target attribute data is 15-16. When the attribute selector is 2, it may be determined that the address of the target attribute data is 19-20.

Step 305: The GPU obtains the target attribute data from the continuous storage space based on the address.

After determining the address of the target attribute data, the GPU may obtain the target attribute data from the address, so as to render the to-be-rendered material based on the target attribute data.

In this embodiment, after the GPU obtains the rendering data sent by the CPU, the GPU arranges the plurality of pieces of attribute data of the same attribute type in the rendering data into the data space, so that the GPU can directly determine the address of the target attribute data in the continuous storage space based on the attribute selector, thereby obtaining the target data, avoiding performing condition determining by the GPU, ensuring that the GPU can have high instruction execution efficiency, and improving rendering efficiency of the GPU.

The foregoing describes in detail a process in which the GPU obtains the target attribute data. For ease of understanding, the following describes in detail a process in which the GPU arranges a plurality of pieces of attribute data of a same attribute type into continuous storage space with reference to a specific example.

Figure 7:
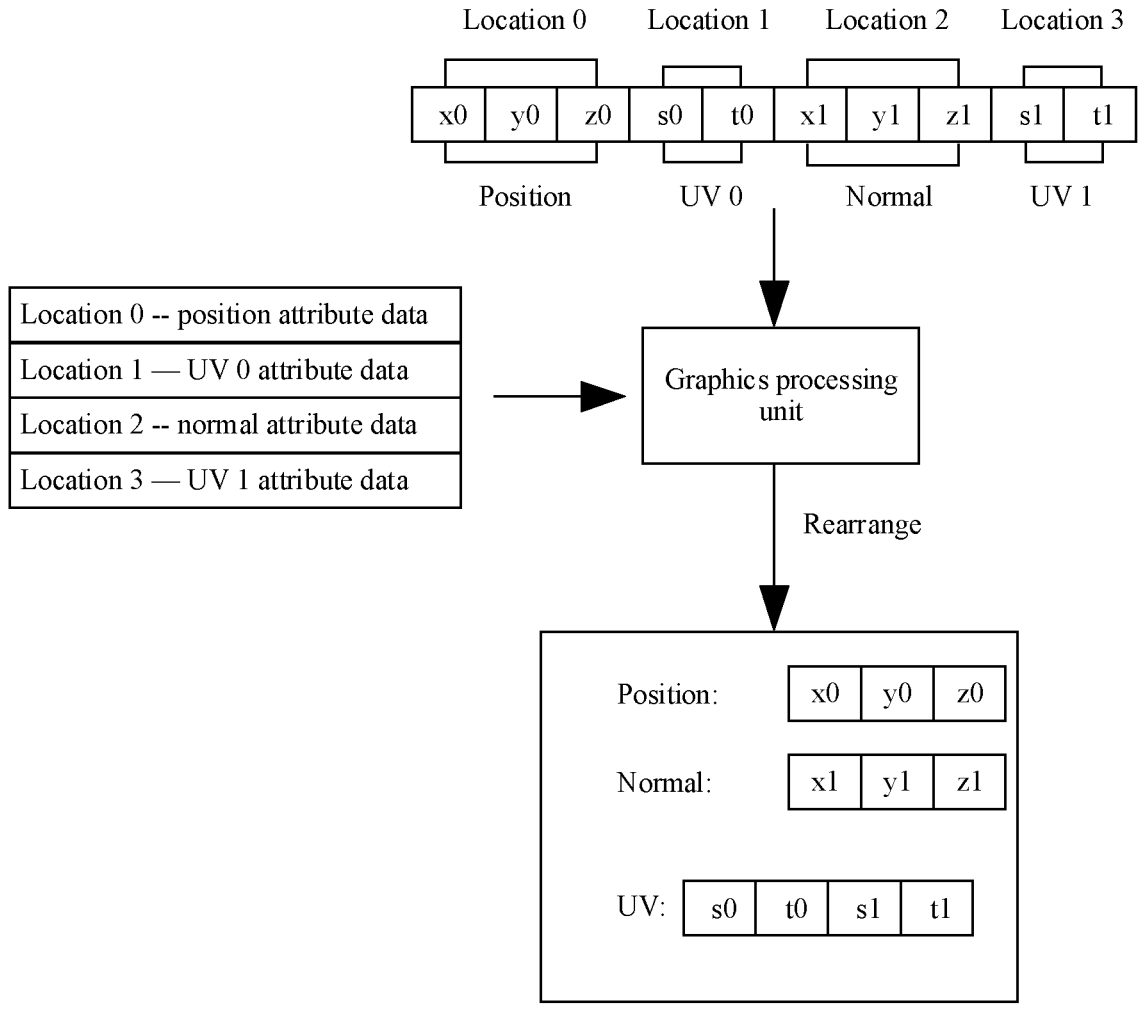
FIG. 7 is a schematic diagram of rearranging attribute data by a GPU according to an embodiment of this disclosure.

FIG. 7 is a schematic diagram of rearranging attribute data by a GPU according to an embodiment of this disclosure. As shown in FIG. 7, a CPU may separately send vertex data and indication information to a GPU. The vertex data includes four locations, which are respectively a location 0, a location 1, a location 2, and a location 3. Position attribute data (x0, y0, z0), UV attribute data 0 (s0, t0), normal attribute data (x1, y1, z1), and UV attribute data 1 (s1, t1) are sequentially stored in the four locations. The indication information includes a mapping relationship between a location and attribute data, that is, indicates attribute data stored in each location.

Based on the foregoing vertex data and the indication information, the GPU may rearrange the obtained vertex data. For example, the GPU may separately store attribute data of three different attribute types: position attribute data, UV attribute data, and normal attribute data in different address spaces, and mark an attribute type of attribute data stored in each address space. The GPU may store the position attribute data in the location 0 in an address space 1, store the normal attribute data in the location 2 in an address space 2, and store the UV attribute data 0 and the UV attribute data 1 in the location 1 and the location 3 in an address space 3. In addition, the UV attribute data 0 and the UV attribute data 1 are stored in the address space 3 based on a sequence of numbers of locations corresponding to the UV attribute data 0 and the UV attribute data 1. That is, the UV attribute data 0 is located before the UV attribute data 1. In this way, in a process of performing rendering by the GPU, when the GPU needs to invoke the UV attribute data, a specific address of the corresponding UV attribute data in the address space 3 may be determined based on the attribute selector, so as to obtain the UV attribute data.

Figure 8:
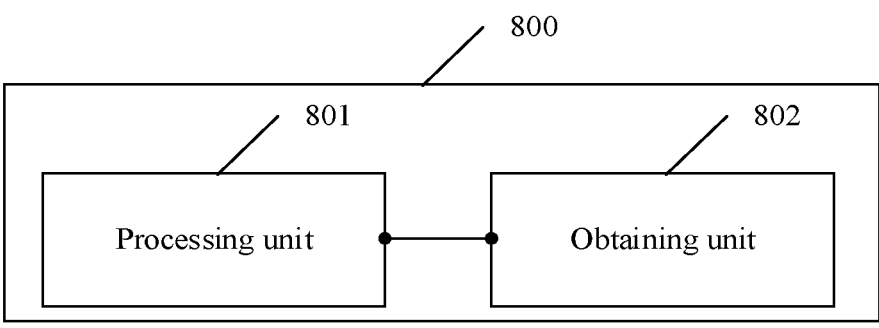
FIG. 8 is a schematic diagram of a structure of an electronic device according to an embodiment of this disclosure.

According to embodiments corresponding to FIG. 1 to FIG. 7, to better implement the foregoing solutions in embodiments of this disclosure, the following further provides related devices configured to implement the foregoing solutions. FIG. 8 is a schematic diagram of a structure of an electronic device 800 according to an embodiment of this disclosure. The electronic device 800 includes a processing unit 801 and an obtaining unit 802. The obtaining unit 802 is configured to obtain rendering data sent by a CPU, where the rendering data includes a plurality of pieces of attribute data, and attribute types of the plurality of pieces of attribute data are the same. The processing unit 801 is configured to arrange the plurality of pieces of attribute data into continuous storage space. The obtaining unit 802 is further configured to obtain an attribute selector corresponding to a to-be-rendered material, where the attribute selector is used to select attribute data for rendering the to-be-rendered material. The processing unit 801 is further configured to determine an address of target attribute data in the continuous storage space based on the attribute selector, where the target attribute data is used to render the to-be-rendered material. The processing unit 801 is further configured to obtain the target attribute data from the continuous storage space based on the address.

In a possible implementation, the processing unit 801 is further configured to arrange the plurality of pieces of attribute data into the continuous storage space based on a storage sequence of the plurality of pieces of attribute data in the rendering data.

In a possible implementation, the obtaining unit 802 is further configured to obtain indication information sent by the CPU, where the indication information indicates location information of the plurality of pieces of attribute data in the rendering data. The processing unit 801 is further configured to determine, based on the indication information, a storage location of each of the plurality of pieces of attribute data in the rendering data. The processing unit 801 is further configured to arrange the plurality of pieces of attribute data into the continuous storage space based on a sequence of the storage locations.

In a possible implementation, the indication information includes a mapping relationship between an attribute index and a storage location in the rendering data, and the attribute index indicates each of the plurality of pieces of attribute data.

In a possible implementation, the storage location in the rendering data is used to store one or more pieces of attribute data of a same attribute type.

In a possible implementation, the processing unit 801 is further configured to determine the address of the target attribute data in the continuous storage space based on the attribute selector and a data length of the target attribute data, where data lengths of the plurality of pieces of attribute data are the same.

In a possible implementation, the obtaining unit 802 is further configured to obtain a starting address of the continuous storage space. The processing unit 801 is further configured to: determine a starting address of the target attribute data in the continuous storage space based on the starting address of the continuous storage space and a product of the attribute selector and the data length; and determine an end address of the target attribute data in the continuous storage space based on the starting address of the target attribute data in the continuous storage space and the data length.

In a possible implementation, the rendering data is determined by the CPU based on the to-be-rendered material, and all attribute data included in the rendering data is attribute data required for rendering the to-be-rendered material.

In a possible implementation, the rendering data includes position attribute data, normal attribute data, color attribute data, texture coordinate attribute data, tangent attribute data, joint attribute data, and/or weight attribute data.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this disclosure may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this disclosure essentially, or the part contributing to other technologies, or all or some of the technical solutions may be implemented in a form of a software product. The computer software product is stored in a storage medium, and includes several instructions to enable a computer device (which may be a personal computer, a server, a network device, or the like) to perform all or some of the steps of the methods described in embodiments of this disclosure. The foregoing storage medium includes any medium that can store program code, such as a Universal Serial Bus (USB) flash drive, a removable hard disk, a read-only memory, a random-access memory (RAM), a magnetic disk, or an optical disc.

What is claimed is:

1. A data processing method implemented by a graphics processing unit (GPU), wherein the data processing method comprises:

obtaining, from a central processing unit (CPU), rendering data, wherein the rendering data comprises first pieces of first attribute data, second pieces of second attribute data, and third pieces of third attribute data, wherein all of the first pieces of first attribute data have position attribute data, wherein all of the second pieces of second attribute data have normal attribute data, and wherein all of the third pieces of third attribute data have UV attribute data;

rearranging the rendering data to obtain a first group of attribute data comprising the first pieces of first attribute data, a second group of attribute data comprising the second pieces of second attribute data, and a third group of attribute data comprising the third pieces of third attribute data;

obtaining, from the CPU, indication information comprising mapping relationships identifying the position attribute data and a first location associated with the position attribute data, the normal attribute data and a second location associated with the normal attribute data, and the UV attribute data and a third location associated with the UV attribute data;

separately storing, based on the mapping relationships, the first group of attribute data to a first address space of a continuous storage space, the second group of attribute data to a second address space of the continuous storage space, and the third group of attribute data to a third address space of the continuous storage space by:

storing the first group of attribute data having the position attribute data to the first location in the first address space and marking a first indication of the position attribute data stored in the first address space;

storing the second group of attribute data having the normal attribute data to the second location in the second address space and marking a second indication of the normal attribute data stored in the second address space; and storing the third group of attribute data having the UV attribute data to the third location in the third address space and marking a third indication of the UV attribute data stored in the third address space;

obtaining an attribute selector corresponding to a to-be-rendered material, wherein the attribute selector is for selecting one of the first group of attribute data, the second group of attribute data, or the third group of attribute data as target attribute data for rendering the to-be-rendered material;

obtaining, based on the attribute selector, an address of the target attribute data in the continuous storage space; and obtaining, based on the address, the target attribute data from the continuous storage space.

2. The data processing method of claim 1, further comprising arranging, based on a storage sequence, the first group of attribute data, the second group of attribute data, and the third group of attribute data into the continuous storage space.

3. The data processing method of claim 2, further comprising:

obtaining, based on the indication information, storage locations of the first group of attribute data, the second group of attribute data, and the third group of attribute data; and arranging, based on a sequence of the storage locations, the first group of attribute data, the second group of attribute data, and the third group of attribute data into the continuous storage space.

4. The data processing method of claim 3, wherein one of the storage locations is for storing one of the first group of attribute data, the second group of attribute data, or the third group of attribute data having a same attribute type.

5. The data processing method of claim 1, wherein obtaining the address comprises obtaining, based on the attribute selector and a first data length of the target attribute data, the address.

6. The data processing method of claim 5, further comprising obtaining a first starting address of the continuous storage space, and wherein obtaining the address comprises:

obtaining, based on the first starting address and a product of the attribute selector and the first data length, a second starting address of the target attribute data; and obtaining, based on the second starting address and the first data length, an end address of the target attribute data.

7. The data processing method of claim 1, wherein the rendering data are based on the to-be-rendered material.

8. The data processing method of claim 1, wherein the rendering data further comprise texture coordinate attribute data or tangent attribute data.

9. The data processing method of claim 1, wherein the UV attribute data in the rendering data is from at least two different locations, and wherein after rearranging the rendering data, the UV attribute data from the at least two different locations are stored to the same third address space of the continuous storage space.

10. The data processing method of claim 1, wherein the indication information is obtained from the CPU separately from the rendering data.

11. The data processing method of claim 10, wherein the indication information comprises a table identifying each location and corresponding attribute data stored at each location.

12. An electronic device, comprising:

a central processing unit (CPU); and a graphics processing unit (GPU) coupled to the CPU and configured to:

obtain, from the CPU, rendering data, wherein the rendering data comprises first pieces of first attribute data, second pieces of second attribute data, and third pieces of third attribute data, wherein all of the first pieces of first attribute data have position attribute data, wherein all of the second pieces of second attribute data have normal attribute data, and wherein all of the third pieces of UV attribute data;

rearrange the rendering data to obtain a first group of attribute data comprising the first pieces of first attribute data, a second group of attribute data comprising the second pieces of second attribute data, and a third group of attribute data comprising the third pieces of third attribute data;

obtain, from the CPU, indication information comprising mapping relationships identifying the position attribute data and a first location associated with the position attribute data, the normal attribute data and a second location associated with the normal attribute data, and the UV attribute data and a third location associated with the UV attribute data;

separately store, based on the mapping relationships, the first group of attribute data to a first address space of a continuous storage space, the second group of attribute data to a second address space of the continuous storage space, and the third group of attribute data to a third address space of the continuous storage space by:

storing the first group of attribute data having the position attribute data to the first location in the first address space and marking a first indication of the position attribute data stored in the first address space;

storing the second group of attribute data having the normal attribute data to the second location in the second address space and marking a second indication of the normal attribute data stored in the second address space; and storing the third group of attribute data having the UV attribute data to the third location in the third address space and marking a third indication of the UV attribute data stored in the third address space;

obtain an attribute selector corresponding to a to-be-rendered material, wherein the attribute selector is for selecting one of the first group of attribute data, the second group of attribute data, or the third group of attribute data as target attribute data for rendering the to-be-rendered material;

obtain, based on the attribute selector, an address of the target attribute data in the continuous storage space; and obtain, based on the address, the target attribute data from the continuous storage space.

13. The electronic device of claim 12, wherein the GPU is further configured to arrange, based on a storage sequence, the first group of attribute data, the second group of attribute data, and the third group of attribute data into the continuous storage space.

14. The electronic device of claim 13, wherein the GPU is further configured to:

obtain, based on the indication information, storage locations of the first group of attribute data, the second group of attribute data, and the third group of attribute data; and arrange, based on a sequence of the storage locations, the first group of attribute data, the second group of attribute data, and the third group of attribute data into the continuous storage space.

15. The electronic device of claim 14, wherein one of the storage locations is for storing one of the first group of attribute data, the second group of attribute data, or the third group of attribute data having a same attribute type.

16. The electronic device of claim 12, wherein the GPU is further configured to obtain, based on the attribute selector and a first data length of the target attribute data, the address.

17. The electronic device of claim 16, wherein the GPU is further configured to:

obtain a first starting address of the continuous storage space;

obtain, based on the first starting address and a product of the attribute selector and the first data length, a second starting address of the target attribute data; and obtain, based on the second starting address and the first data length, an end address of the target attribute data.

18. The electronic device of claim 12, wherein the CPU is further configured to obtain, based on the to-be-rendered material, the rendering data.

19. The electronic device of claim 12, wherein the rendering data further comprise joint attribute data or weight attribute data.

20. A computer program product comprising instructions stored on a non-transitory computer-readable medium that, when execute by one or more processors, cause a graphics processing unit (GPU) to:

obtain, from a central processing unit (CPU), rendering data, wherein the rendering data comprises first pieces of first attribute data, second pieces of second attribute data, and third pieces of third attribute data, wherein all of the first pieces of first attribute data have position attribute data, wherein all of the second pieces of second attribute data have normal attribute data, and wherein all of the third pieces of third attribute data have UV attribute data;

rearrange the rendering data to obtain a first group of attribute data comprising the first pieces of first attribute data, a second group of attribute data comprising the second pieces of second attribute data, and a third group of attribute data comprising the third pieces of third attribute data;

obtain, from the CPU, indication information comprising mapping relationships identifying the position attribute data and a first location associated with the position attribute data, the normal attribute data and a second location associated with the normal attribute data, and the UV attribute data and a third location associated with the UV attribute data;

separately store, based on the mapping relationships, the first group of attribute data to a first address space of a continuous storage space, the second group of attribute data to a second address space of the continuous storage space, and the third group of attribute data to a third address space of the continuous storage space by:

storing the first group of attribute data having the position attribute data to the first location in the first address space and marking a first indication of the position attribute data stored in the first address space;

storing the second group of attribute data having the normal attribute data to the second location in the second address space and marking a second indication of the normal attribute data stored in the second address space; and storing the third group of attribute data having the UV attribute data to the third location in the third address space and marking a third indication of the UV attribute data stored in the third address space;

obtain an attribute selector corresponding to a to-be-rendered material, wherein the attribute selector is for selecting one of the first group of attribute data, the second group of attribute data, or the third group of attribute data as target attribute data for rendering the to-be-rendered material;

obtain, based on the attribute selector, an address of the target attribute data in the continuous storage space; and obtain, based on the address, the target attribute data from the continuous storage space.

* * * * *